United States Patent
Femal

(10) Patent No.: US 9,467,569 B2
(45) Date of Patent: Oct. 11, 2016

(54) METHODS AND APPARATUS FOR REDUCING AUDIO CONFERENCE NOISE USING VOICE QUALITY MEASURES

(71) Applicant: RAYTHEON COMPANY, Waltham, MA (US)

(72) Inventor: Michael J. Femal, St. Petersburg, FL (US)

(73) Assignee: RAYTHEON COMPANY, Waltham, MA (US)

( * ) Notice: Subject to any disclaimer, the term of this patent is extended or adjusted under 35 U.S.C. 154(b) by 63 days.

(21) Appl. No.: 14/639,664

(22) Filed: Mar. 5, 2015

(65) Prior Publication Data

US 2016/0261749 A1 Sep. 8, 2016

(51) Int. Cl.
*H04M 1/64* (2006.01)
*H04M 3/56* (2006.01)

(52) U.S. Cl.
CPC ................... *H04M 3/568* (2013.01)

(58) Field of Classification Search
CPC ...................................... H04M 3/568
See application file for complete search history.

(56) References Cited

U.S. PATENT DOCUMENTS

| | | | |
|---|---|---|---|
| 4,672,669 A | 6/1987 | DesBlache et al. | |
| 6,125,343 A | 9/2000 | Schuster | |
| 6,353,662 B1 | 3/2002 | Foladare et al. | |
| 6,504,838 B1 * | 1/2003 | Kwan | G10L 25/90 370/352 |
| 6,549,587 B1 * | 4/2003 | Li | H04B 3/23 375/324 |
| 6,556,670 B1 | 4/2003 | Horn | |
| 6,765,931 B1 * | 7/2004 | Rabenko | H04B 3/23 348/E7.049 |
| 6,870,807 B1 | 3/2005 | Chan et al. | |
| 6,956,828 B2 | 10/2005 | Simard et al. | |
| 7,020,257 B2 | 3/2006 | Li | |
| 7,145,884 B2 | 12/2006 | Li | |
| 7,269,252 B2 | 9/2007 | Eran | |
| 7,853,007 B2 | 12/2010 | Tittel et al. | |
| 7,876,890 B2 | 1/2011 | Diethorn | |
| 7,966,178 B2 | 6/2011 | Gustavsson | |
| 7,983,200 B2 | 7/2011 | Simard et al. | |
| 7,986,644 B2 | 7/2011 | Frankel | |
| 8,218,751 B2 | 7/2012 | Hepworth et al. | |
| 8,296,133 B2 | 10/2012 | Wang | |
| 8,554,547 B2 | 10/2013 | Wang | |
| 8,612,211 B1 | 12/2013 | Shires et al. | |
| 2003/0061042 A1 | 3/2003 | Garudadri | |
| 2003/0128830 A1 | 7/2003 | Coffman et al. | |
| 2006/0067329 A1 * | 3/2006 | Lee | H04L 41/5003 370/395.21 |
| 2007/0091873 A1 * | 4/2007 | LeBlanc | H04B 3/23 370/352 |

(Continued)

FOREIGN PATENT DOCUMENTS

WO 95/28824 A2 11/1995

OTHER PUBLICATIONS

Bachu R G et al: "Separation of Voiced and Unvoiced using Zero crossing rate and Energy of the Speech Signal", ASEE, Dec. 2, 2008, p. 1-p. 6.

(Continued)

*Primary Examiner* — Joseph T Phan
(74) *Attorney, Agent, or Firm* — Lando & Anastasi, LLP

(57) ABSTRACT

Methods and apparatus for monitoring audio quality and controlling noise in telephone conferences. In one example, voice activity detection processing is implemented based on the energy in the audio signal of each channel and the zero crossing rate of the audio signal to differentiate noise from speech. Certain examples further include the use of a voice quality index and activity timer to determine audio quality.

15 Claims, 12 Drawing Sheets

(56) References Cited

U.S. PATENT DOCUMENTS

| | | |
|---|---|---|
| 2009/0125304 A1 | 5/2009 | Cho |
| 2011/0038362 A1 | 2/2011 | Vos et al. |
| 2013/0030800 A1 | 1/2013 | Tracey et al. |
| 2014/0286497 A1 | 9/2014 | Thyssen et al. |
| 2015/0348548 A1* | 12/2015 | Piernot .................. G10L 15/22 704/235 |

OTHER PUBLICATIONS

Mojtaba Radmard et al: "A New Method of Voiced/Unvoiced Classification Based on Clustering", Journal of Signal and Information Processing, Nov. 4, 2011, pp. 336-347.
International Search Report and Written Opinion for PCT/US2015/064413 mailed Feb. 12, 2016.

* cited by examiner

METHODS AND APPARATUS FOR REDUCING AUDIO CONFERENCE NOISE USING VOICE QUALITY MEASURES

FEDERALLY SPONSORED RESEARCH

This invention was made with government support under contract No. FA8217-11-D-0001-0276 awarded by the Department of Defense. The U.S. government has certain rights in the invention.

BACKGROUND

Telephone conferences with a large number of members can be subject to disruptive background noise. This is especially true when members of the conference are located in industrial or military settings with high audio volume fans, blowers, or other equipment. It can be difficult to locate the source of the noise due to the large number of members. In addition, processing must be done very efficiently because it has to be replicated for all members of all conferences in a system.

To address the issue of noise, some conventional systems use a "push to talk" handset to only allow audio into a conference when a handset button is pushed. In other systems, a voltage or power threshold is used to enable audio to be added to a conference. Other systems rely on members of the conference to put their telephones into a "mute" mode when not they are talking. Alternatively, a conference operator may determine which member(s) are constantly active and place those members into a mute mode. However, these methods rely on the members of the conference to take action, and may be ineffective or cause unintended interruptions in the conference.

A need exists for an automatic and efficient technique for reducing noise in audio conferences, particularly those conferences involving a large number of members and/or noisy environments.

SUMMARY OF INVENTION

Aspects and embodiments are directed to techniques and implementations to provide automatic filtering of noisy conference members to reduce or eliminate background noise from the conference audio. As discussed in more detail below, certain embodiments use advanced voice activity detection (VAD) to filter all incoming audio to a conference, which allows for reducing general accumulated background noise in a conference. Certain embodiments further include a method to measure the audio quality from each member of a conference to detect noisy conference members that require additional filtering. Audio quality may be determined using a voice quality index and an activity timer, as discussed further below. Processing may be accomplished efficiently for a large number of audio channels using hardware, firmware, and/or software, for example in a field programmable gate array (FPGA) implementation.

According to one embodiment, a method of reducing noise in a multi-channel audio conference includes, for each channel in the multi-channel audio conference, acts of receiving an audio signal, analyzing the audio signal using a voice activity detection process to determine whether the audio signal corresponds to voice or noise, the analyzing including calculating an energy of a packet of the audio signal, calculating a zero crossing rate (ZCR) of the packet, and comparing the energy of the packet against an energy threshold, determining that the audio signal is in an active state responsive to the energy of the packet exceeding the energy threshold, or that the audio signal is in an inactive state responsive to the energy of the packet not exceeding the energy threshold, recording an activity timer value equal to an amount of time elapsed until a change between the active state and the inactive state of the audio signal, calculating a voice quality index (VQI), and producing an indication that the audio signal contains voice based on a combination of the voice activity detection process, the activity timer value, and the VQI.

Various embodiments of the method may include any one or more of the following features.

In one example calculating the ZCR of the packet includes counting a number of times a polarity of the audio signal changes in the packet. The method may further include acts of comparing the ZCR of the packet to a first threshold value defining an upper limit for a voice range of the ZCR, comparing the ZCR of the packet to a second threshold value defining a lower limit for the voice range, and producing a ZCR voice signal responsive to the ZCR of the packet being with the voice range. In one example calculating the VQI includes initializing a VQI timer, incrementing the VQI timer responsive to the energy of the packet exceeding the energy threshold and the ZCR of the packet being outside the voice range, decrementing the VQI timer responsive to the energy of the packet exceeding the energy threshold and the ZCR of the packet being within the voice range, and reading out the VQI timer to provide the VQI. In another example analyzing the audio signal using the voice activity detection process includes determining that the audio signal corresponds to voice based on a combination of the ZCR voice signal and the energy of the packet exceeding the energy threshold. The method may further include automatically adjusting the energy threshold based on the activity timer value or based on a combination of the activity timer and the VQI. In one example automatically adjusting the energy threshold includes increasing the energy threshold responsive to the audio signal being in the active state, the activity timer value exceeding a first time limit, and the VQI being below a VQI noise threshold value. In another example automatically adjusting the energy threshold further includes decreasing the energy threshold responsive to the audio signal being in the active state, the activity timer value exceeding a second time limit, and the VQI being above a VQI voice threshold value.

Another embodiment is directed to an audio conference switch including circuitry configured to implement the method according to any of the above examples and embodiments.

According to another embodiment, a field-programmable gate array (FPGA) implemented audio conference noise control circuit comprises a zero crossing rate (ZCR) module configured to receive an audio signal and to determine a ZCR of a packet of the audio signal, an energy calculation module configured to receive the audio signal and to determine an energy of the packet of the audio signal and output an encoded power value signal representative of the energy of the packet of the audio signal, an energy threshold module configured to compare the encoded power value signal to an energy threshold value and to output an energy-over-threshold signal responsive to the encoded power value signal exceeding the energy threshold value, an activity timer configured to receive the energy-over-threshold signal from the energy threshold module and to output an activity timer signal representing an amount of time for which the energy-over-threshold signal has been maintained, and a voice quality index (VQI) module configured to output a VQI of the audio signal, the VQI module including a counter configured to increment responsive to the energy of the packet of the audio signal exceeding the energy threshold value and the ZCR being outside of a range of ZCR values for voice, and to decrement responsive to the energy of the packet of the audio signal exceeding the energy threshold value and the ZCR being within the range of ZCR values for voice, the VQI corresponding to an output value of the counter.

Various embodiments of the circuit may include any one or more of the following features.

In one example, the ZCR module is further configured to compare the ZCR to a first threshold value and a second threshold value higher than the first threshold value, ZCR values between the first threshold value and the second threshold value corresponding to the range of ZCR values for voice. In another example, the ZCR module is configured to determine the ZCR by counting a number of times a polarity of the audio signal changes in the packet. The FPGA implemented audio conference noise control circuit may further comprise an automatic energy threshold adjustment module configured to automatically adjust the energy threshold value based on the activity timer signal. In one example, the automatic energy threshold adjustment module is configured to increase the energy threshold value responsive to the time for which the energy-over-threshold signal has been maintained exceeding an activity timer threshold value. In another example, the automatic energy threshold adjustment module is further configured to automatically adjust the energy threshold value based on a combination of the activity timer signal and the VQI.

Another embodiment is directed to an audio conference switch including the FPGA-implemented circuit according to any of the above examples and embodiments.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to techniques for improving audio quality (reducing noise) in telephone conferences. According to certain embodiments, advanced voice activity detection is used to provide automatic filtering of incoming audio to a conference to reduce or even eliminate background noise from the conference audio. As discussed in more detail below, certain embodiments use the frequency spectrum of the incoming noise, and natural breaks in speech, to differentiate noise from speech. An additional low frequency threshold may be included separate lower frequency voice from higher frequency noise, and improve the filtering. Certain embodiments further include the use of a long term voice quality measure that determines how much noise versus speech is present on an audio line/channel. Audio quality may be determined using a voice quality index and an activity timer, as discussed further below. Systems may be configured to automatically mute or otherwise "squelch" noisy conference members (channels) to prevent them from disrupting a conference. Embodiments of the algorithms and techniques disclosed herein may be implemented in hardware, firmware, and/or software, for example, using an FPGA implementation that may be part of a central audio/conference switch.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
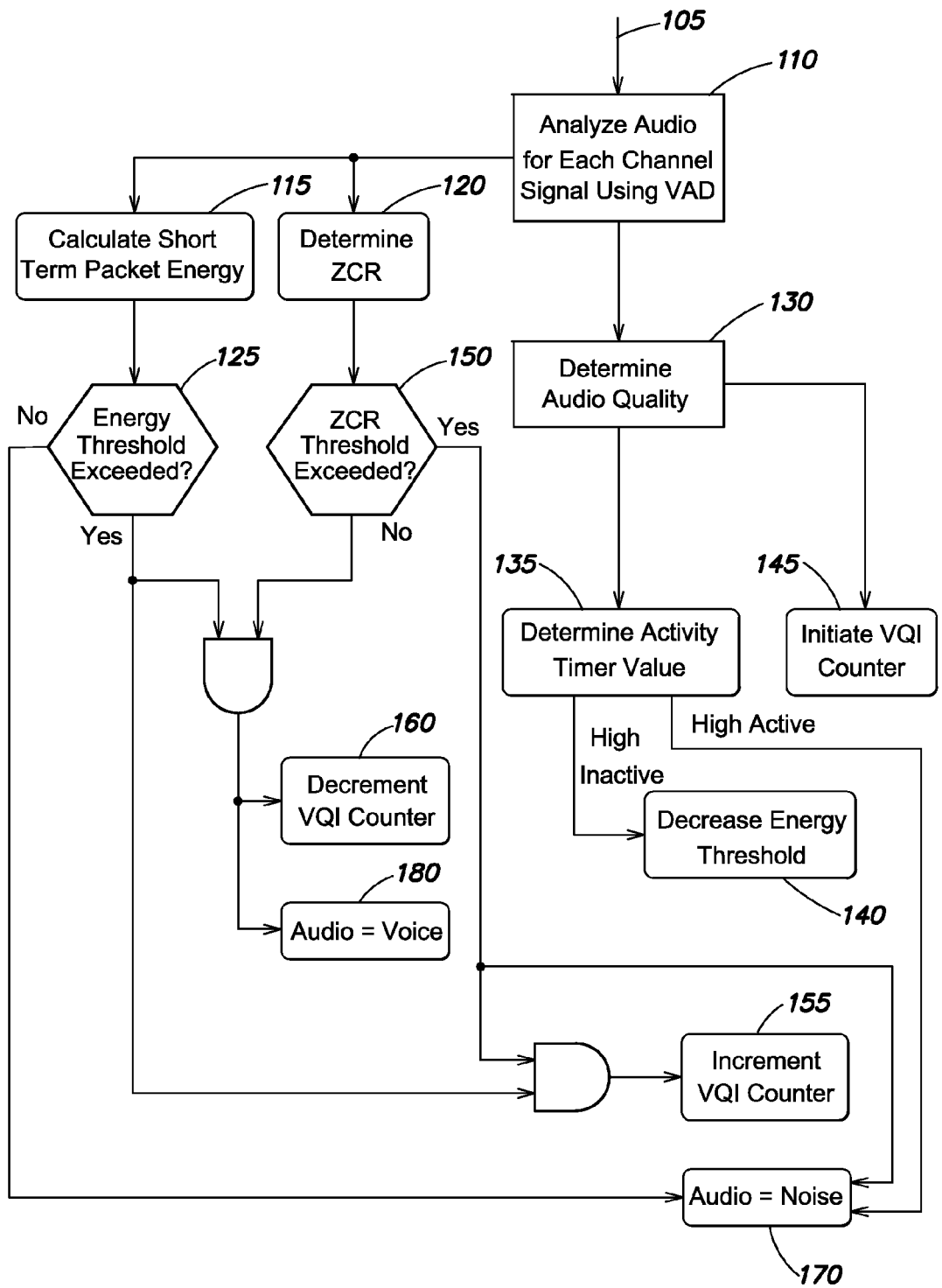
FIG. 1 is a flow diagram of one example of a method of reducing audio conference noise according to aspects of the present invention.

Referring to FIG. 1 there is illustrated a flow diagram of one example of an audio processing method according to certain aspects and embodiments. As discussed above, in one embodiment, the audio signal 105 for each channel is analyzed using voice activity detection to determine whether the signal contains speech or only noise (step 110). According to certain embodiments, voice activity detection (VAD) is an algorithm that uses the short term energy of audio and the Zero Crossing Rate (ZCR) to determine if voice activity is present in the audio signal. In one example, the short term energy of a packet of audio is calculated using a sum of the voltage squared (step 115). The ZCR may be determined by counting the number of times the polarity of the audio signal changes in a packet (step 120). The ZCR is higher for noise than it is for voice, and is an indicator of the frequency at which the energy in the audio signal is concentrated. In one embodiment, thresholds for minimum energy (125) and maximum ZCR (150) are used to indicate audio is voice and not noise. A hold-over timer may be used to keep the voice determination active through breaks in the speech pattern, as discussed further below. Examples of implementations of the energy and ZCR calculations are discussed further below with reference to FIGS. 3 and 6, respectively.

According to one embodiment, VAD is used to determine which members of a conference have their audio summed together for the conference audio. Accordingly, changing the energy threshold may remove noise from a conference. As discussed further below, according to certain embodiments, a global energy threshold is set for the minimum energy needed, and is adjusted upward based on noise. VAD conventionally uses a single threshold to separate lower frequency voice from higher frequency noise. Voice audio typically concentrates in the mid range and some sources of noise are low frequency, such as a 60 Hz power hum, for example. The addition of a low ZCR threshold according to certain embodiments can further distinguish voice from low frequency noise sources.

According to certain embodiments, the audio quality can be determined (step 130) using an activity timer and a Voice Quality Index (VQI). These can be used to determine the source of noise in a conference, as discussed further below.

In one embodiment, the activity timer keeps track of how much time has passed with audio not changing between active or inactive states based on the energy threshold applied in step 125. The activity timer value can be determined (step 135) and used in conjunction with the VQI and energy threshold to evaluate whether the audio signal is voice or noise. The active state (i.e., energy threshold is exceeded) may have a short hold-over delay to account for waveform variations in sample periods. Since speech patterns contain breaks, a high active state timer value is an indicator of noise and not voice data. A high inactive state timer value may indicate that the channel has either no voice or the energy threshold is set too high. In some examples, the energy threshold may be decreased responsive to a high inactive state timer value (step 140).

The VQI is a measure of relative quantities of noise and voice activity on a given channel. According to one embodiment, the VQI calculation circuitry is implemented using a counter that is initiated to a neutral mid range value (step 145). The counter is incremented for each period that the energy of audio exceeds the energy threshold and the ZCR is outside the range for voice (step 155). It is decremented for each period that the energy of audio exceeds the energy threshold and the ZCR within the range for voice (step 160). A low VQI indicates the audio signal 105 is likely to contain large amounts of background noise.

Figure 2A:
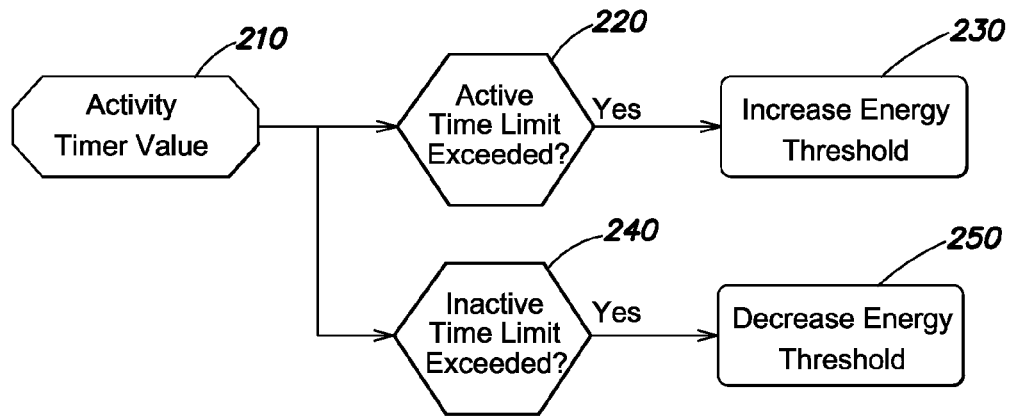
FIG. 2A is a flow diagram of one example of dynamic energy threshold adjustment for noise reduction using VAD according to aspects of the present invention.

A low VQI and a high activity timer value may indicate that a channel is probably a source of noise in a conference and should be subject to an increased energy threshold. This can be an automated adjustment or done under the control of an operator. FIG. 2A illustrates a flow diagram for one example of a method for adjusting the energy threshold to remove noise from an audio conference, according to certain embodiments. In one example, if the activity timer (input 210) indicates that the channel has been active for a time over a certain time limit (block 220); the energy threshold adjustment will be increased (step 230). If the activity timer 210 indicates that the channel has been inactive for a time over a certain time limit (block 240), the energy threshold adjustment may decrease back towards normal (step 250).

Figure 2B:
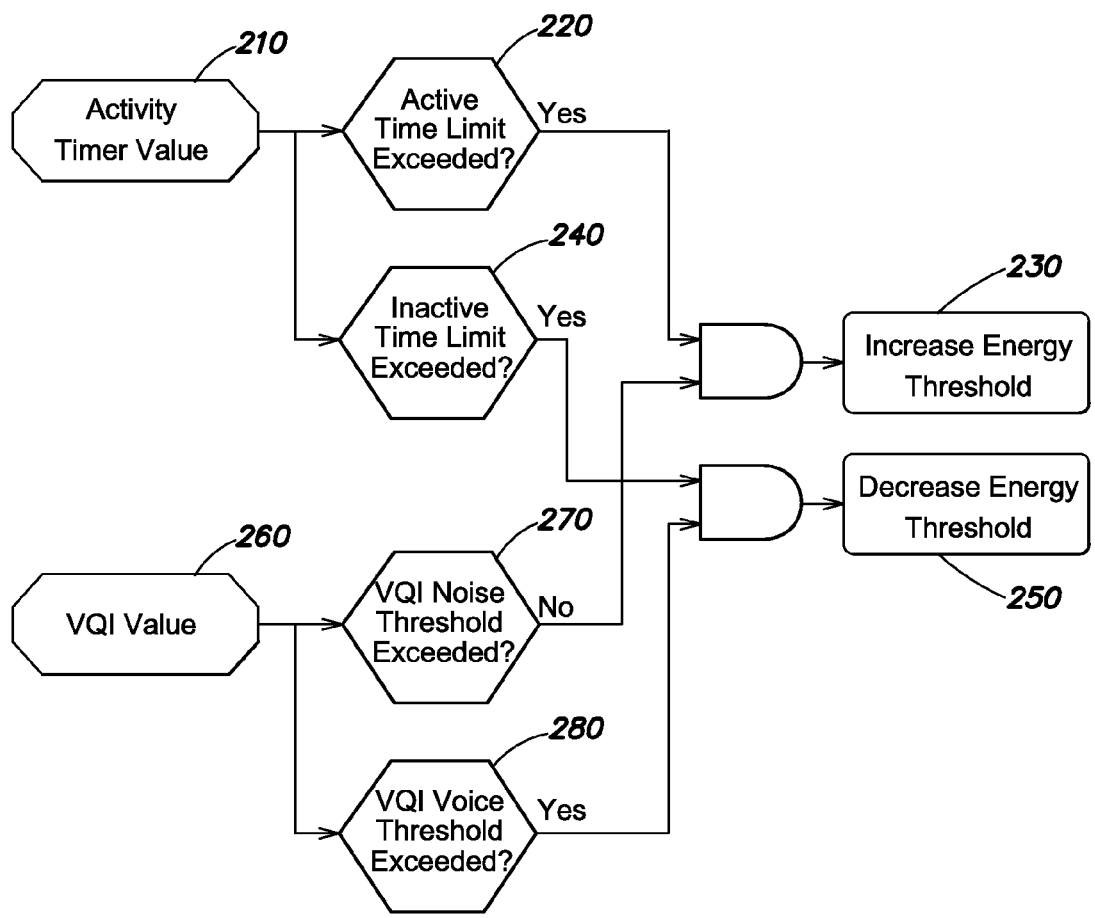
FIG. 2B is a flow diagram of another example of dynamic energy threshold adjustment for noise reduction using VAD according to aspects of the present invention.

As discussed above, the activity timer may also used in conjunction with the VQI to make dynamic adjustments to the energy threshold(s) used for evaluating each channel. For example, referring to FIG. 2B, if the activity timer 210 has exceeded the active time limit (block 220) and the VQI (input 260) is below a noise VQI threshold (270), the energy threshold adjustment may be increased (step 230). This indicates that the channel is exceeding the energy threshold but the frequency content of the ZCR shown by the VQI is indicating that the audio is probably noise and not voice (block 170). If the activity timer 210 has exceeded the inactive time limit (block 240) and the VQI is above a voice VQI threshold (block 280), the energy threshold adjustment may be decreased back towards normal (step 250). This indicates the channel is exceeding the energy threshold and the frequency content of the ZCR shown by the VQI is indicating the audio is probably voice and not noise (block 180).

A more detailed implementation of an example of automatic energy threshold adjustment using the activity timer and VQI is discussed below with reference to FIG. 11.

As discussed above, according to certain embodiments, voice activity and noise detection logic or circuitry may be implemented as various functional processing elements and used with voice conferencing processing to improve audio quality of the conference. The logic may be implemented in hardware, firmware, and/or software, for example, including one or more field programmable gate arrays (FPGAs) or other digital circuits implementing the specific functional elements and components, as discussed below with reference to FIGS. 3-11. According to one embodiment, the circuitry receives linear audio data for each conference channel and determines voice activity and noise detection. As discussed above, short term packet energy and the ZCR may be used to determine whether or not channels should be added to a conference. Embodiments may provide a very programmable solution to addressing conference noise/quality, which can be adapted to different noise environments. As discussed above and in more detail below, certain embodiments may include the capability for automatic adjustment of short term energy thresholds to remove noisy channels from the conference. For example, a software application may interface with the voice activity and noise detection logic/circuitry to adjust short term energy thresholds for special circumstances. Alternatively, the adjustment may be done manually by a conference controller.

According to certain embodiments, the voice activity and noise detection circuitry may be configured for use in a multiple channel conferencing system using memories to context switch between channels. Context switching may be applied for each sample in a TDM (Time Domain Multiplexed) system, or between packets in a packet based system. Channel-based memories used in various components of the circuitry may be dual port memories allowing hardware processing to context switch between channels, and an associated software application to access the data from all channels. Energy and ZCR calculations may be processed at predetermined time intervals, for example, every 125 μS, with results ready at a programmable sample rate, for example, 8, 16, or 32 ms. Most other processing may be updated at the when the short term energy and ZRC results are ready. The following description of the circuitry refers to examples using the above time intervals and sample rates; however, those skilled in the art will appreciate, given the benefit of this disclosure, that numerous other time intervals/sample rates may be used, and the specific examples discussed herein are exemplary only and not intended to be limiting.

As discussed above, the voice activity and noise detection processes and components thereof disclosed herein may be implemented using hardware, firmware, software, or a combination thereof. Certain embodiments may be implemented in one or more FPGAs. The voice activity and noise detection processing may be done efficiently for a large number of channels using an FPGA implementation. In addition, various registers and channel-based memories may be used to store and process data streams produced from the audio signal for each channel, as discussed further below.

Figure 3:
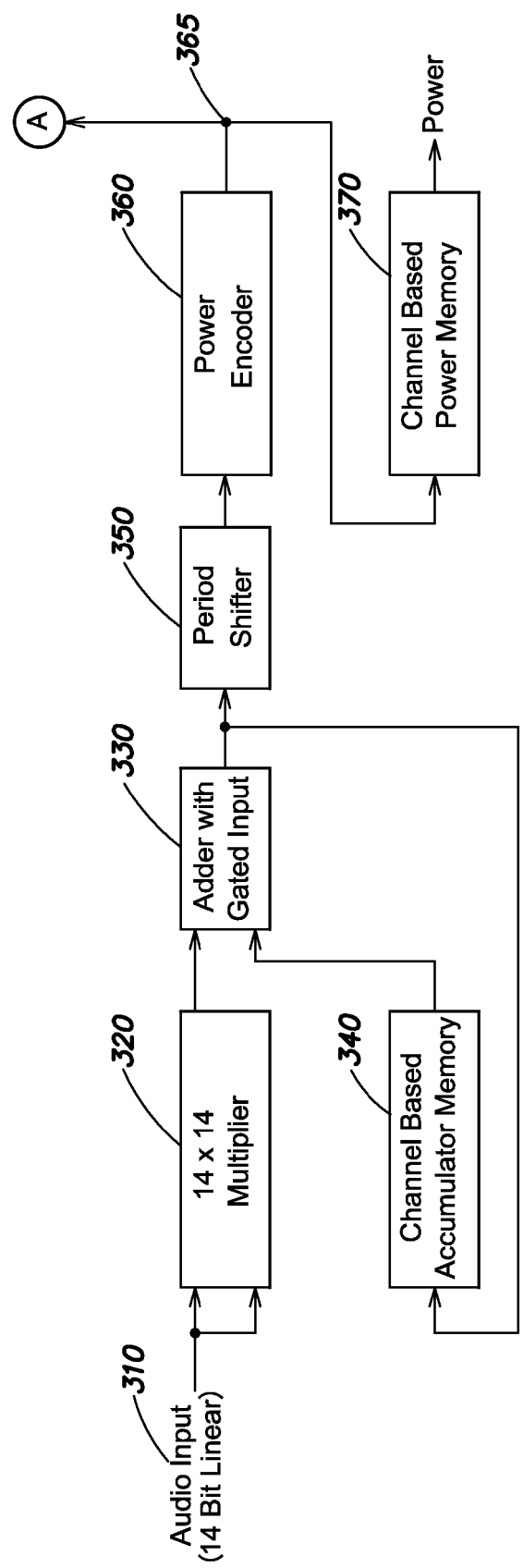
FIG. 3 is functional block diagram of one example of energy calculation logic/circuitry according to aspects of the present invention.

Referring to FIG. 3, there is illustrated a functional block diagram for one example of energy calculation logic/circuitry (an energy calculation module) that is part of the voice activity and noise detection circuitry according to one embodiment. The energy calculation module determines the short term energy of the incoming audio signal 310. In the illustrated example, the audio signal 310 is a 14 bit linear signal; however, any number of bits may be used in other implementations. The audio signal 310 is replicated (provided at two inputs), as shown, and input into a multiplier 320. In the illustrated example, the multiplier 320 is a 14×14 multiplier because the audio signal 310 is a 14-bit signal. Those skilled in the art will appreciate that the size of the multiplier 320 may be selected based on the number of bits of the audio signal 310. The multiplier 320 is used to square the incoming voltage values of the audio signal 310. These squared values are then accumulated using an adder 330 and a channel based accumulator memory 340. The adder 330 and channel based accumulator memory 340 act as an individual accumulator for each channel. In one example, the energy calculation uses an 8, 16, or 32 ms period, corresponding to the programmable sample rate of the overall circuitry discussed above. The accumulator adds the power from a series of samples, for example, 64, 128, or 256 samples at a selected sample rate (e.g., the 125 μS sample rate discussed above). The resultant accumulated power is then divided by the samples in the period (64, 128, or 256, for example) using a period shifter 350. The output from the period shifter 350 is encoded using a power encoder 360. For example, the output from the period shifter 350 may be encoded into a 7 bit value in $3/8$ dB increments by the power encoder 360. However, as will be appreciated by those skilled in the art, other numbers of bits (more or fewer than 7) and other power increments may be used.

Figure 4:
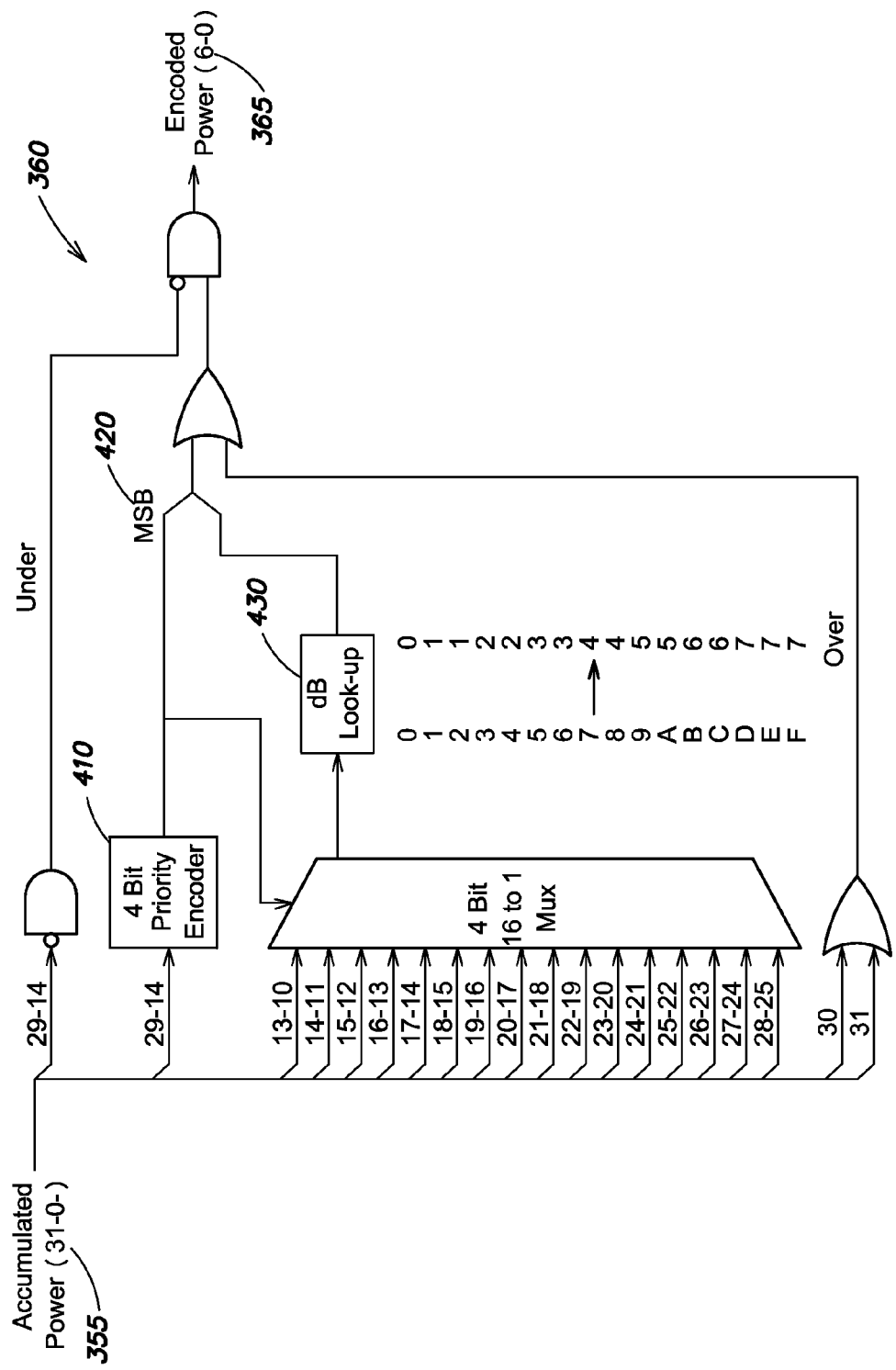
FIG. 4 is a diagram of one example of a power encoder used in the circuit of FIG. 3 according to aspects of the present invention.

FIG. 4 illustrates one implementation of the power encoder 360, according to certain embodiments. The input to the power encoder 360 is the accumulated power 355 output from the period shifter 350. In one non-limiting example, the linear power values are accumulated with no loss for the window of 64 samples. In this example, the maximum linear voltage has a value of 8031. When this is squared, the maximum sample power is 64,496,961. When 64 samples are accumulated, the maximum accumulated power is 4,127,805,504 (32 bit value). In one example, the upper two bits are counted as over-flow. The 16 most significant bits may be run through a priority encoder 410. The priority encoder 410 outputs a value 420 corresponding to the bit position of the most significant bit that is set. This provides a power in 3 dB increments. The priority encoder 410 may also be used to select the next 4 significant bits of the power value output 355 from the period shifter 350. These bits may be run through a look-up table 430 to generate the three least significant bits of the power. In one example, overflow of the power calculation causes the power to be set to the maximum value. The encoded power value output 365 from the power encoder 360 may be stored in a channel based power memory 370 (shown in FIG. 3), allowing software applications to access it on a channel by channel basis.

Figure 5:
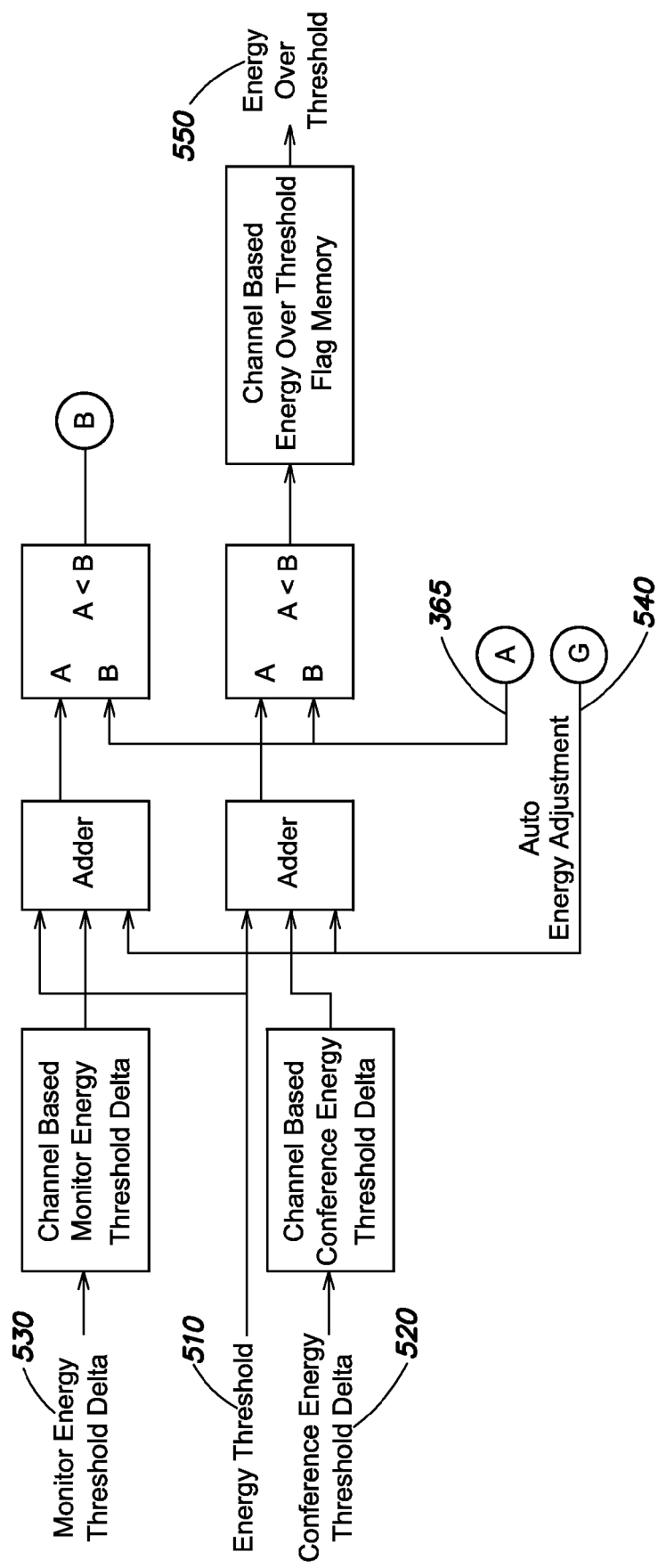
FIG. 5 is a functional block diagram of one example of energy threshold calculation logic/circuitry according to aspects of the present invention.

Referring to FIG. 5, there is illustrated a functional block diagram for one example of energy threshold calculation logic/circuitry (energy threshold module) according to one embodiment. In one example, the energy threshold module compares the encoded power 365 output from the power encoder 360 (at A in FIG. 3) against two energy thresholds. The first energy threshold is the main conference threshold 520 used by the voice activity and noise detection logic to determine voice activity for the ongoing conference, and the second energy threshold is a monitor threshold 530, which may be used by software applications to make adjustments without affecting an ongoing conference. In one example, a base energy threshold 510 is set globally and intended to capture the quietest channel in the conference. All adjustments to the energy thresholds are intended to decrease noise from this point. Software applications may make adjustments to conference and monitor thresholds 520, 530 on a channel by channels basis using channel based delta information. In one example, the energy threshold logic may output an automatic energy adjustment signal 540, which may be used by automatic energy threshold adjustment logic, as discussed above and in more detail below, to adjust conference and monitor thresholds on a channel by channels basis based on calculated audio quality measures discussed below. The energy threshold module may also output an "energy over threshold signal" 550, which may be used in the VQI calculation, as discussed below. The energy over threshold signal 550 indicates that the short term energy of audio signal 310 is above the minimum threshold, as discussed above with reference to FIG. 1.

Figure 6:
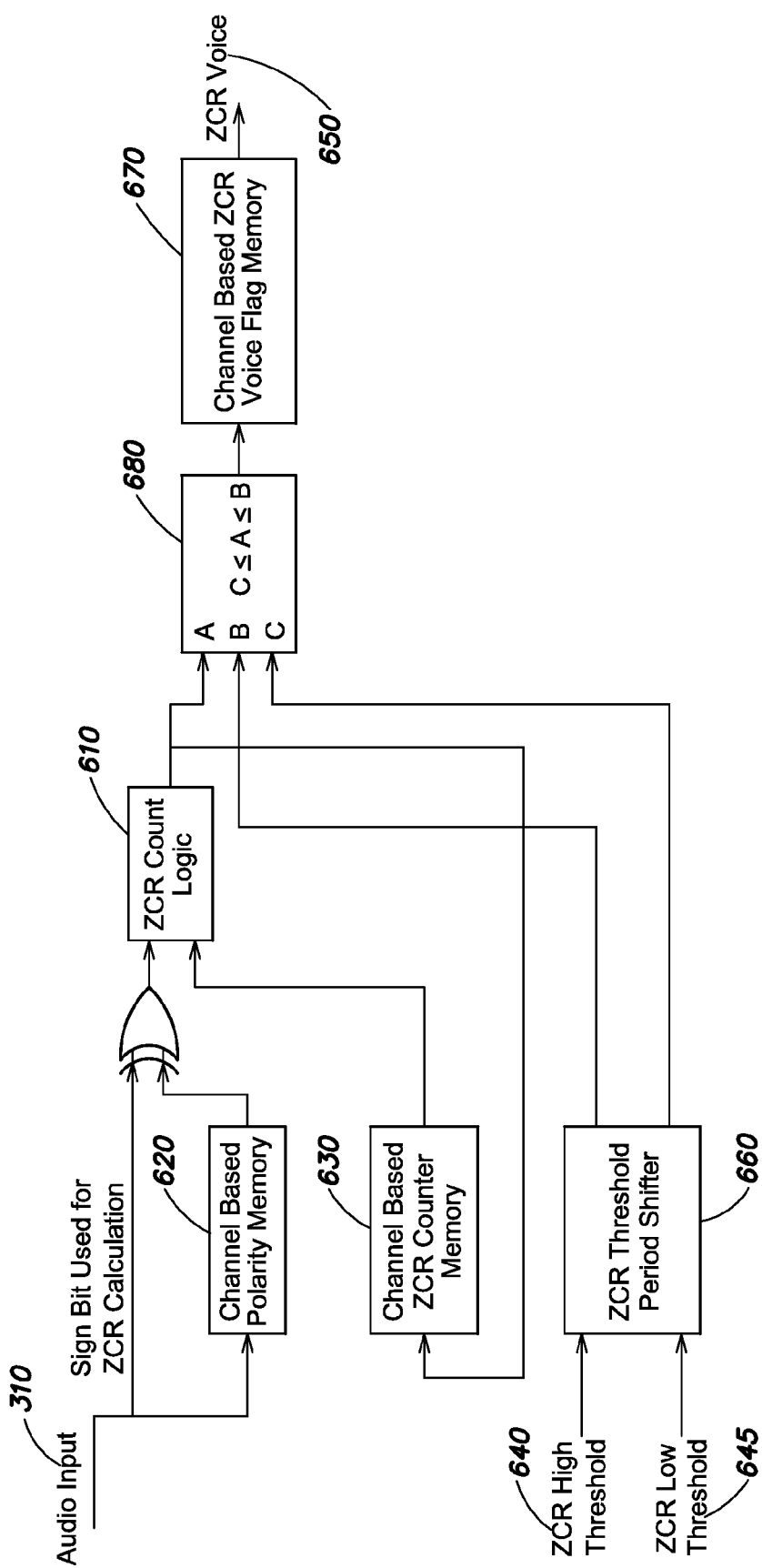
FIG. 6 is a functional block diagram of one example of ZCR calculation logic/circuitry according to aspects of the present invention.

Referring to FIG. 6, there is illustrated a functional block diagram of one example of circuitry configured to implement the ZCR calculation discussed above (ZCR module). In one example, the ZCR is calculated by counting the number of times the polarity of the incoming audio signal 310 changes during a sampling period using ZCR count logic 610. The previous audio polarity and the ZCR count during the period are stored in channel based memories 620 and 630, respectively, thereby allowing the logic to keep track of multiple audio channels. As discussed above, the ZCR is higher for noise than it is for voice, and is an indicator of the frequency at which the energy in the sample is concentrated. Thresholds for maximum and minimum ZCR (640 and 645, respectively) are used to determine whether or not the measured ZCR for a given packet falls within a specified range, corresponding to a likelihood that the audio is voice rather than noise. Block 680 represents the comparison logic, comparing the sample of the incoming audio signal 310 against each of the high and low ZCR thresholds 640, 645. The ZCR module outputs a ZCR voice signal 650 responsive to the comparison result being that the ZCR of the sample of audio signal 310 falls within the range defined by the high and low ZCR thresholds 640, 645, and indicating that the sample of the audio 310 may likely be voice. The sampling period is programmable, for example, may be 8, 16, or 32 ms as discussed above, such that the thresholds are shifted to provide a consistent frequency response (represented at block 660). This implementation conserves memory resources by reporting the voice/noise decision for a sample period, rather than reporting the raw ZCR data to software for decision making. The ZCR voice signal 650, representing an indication that the ZCR data suggests that the audio signal 310 is voice rather than noise, may be stored in a memory 670 for access and use by other hardware, firmware, and/or software system components. Thresholds and other data relating to the ZCR calculation circuitry may be stored in a ZCR configuration register, as discussed further below.

Figure 7A:
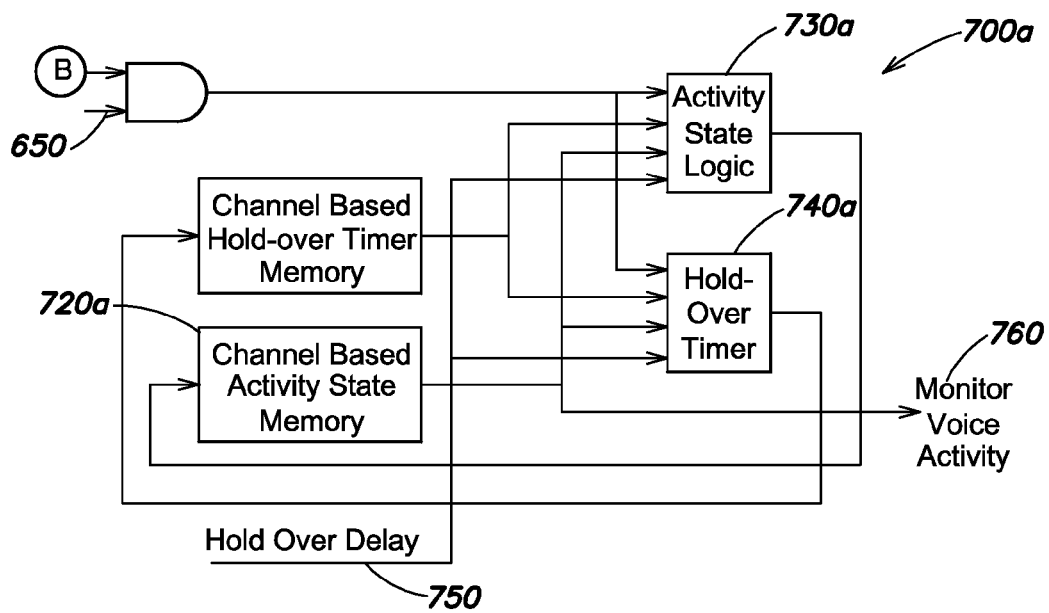
FIG. 7A is a functional block diagram of one example of monitor VAD logic/circuitry according to aspects of the present invention.
Figure 7B:
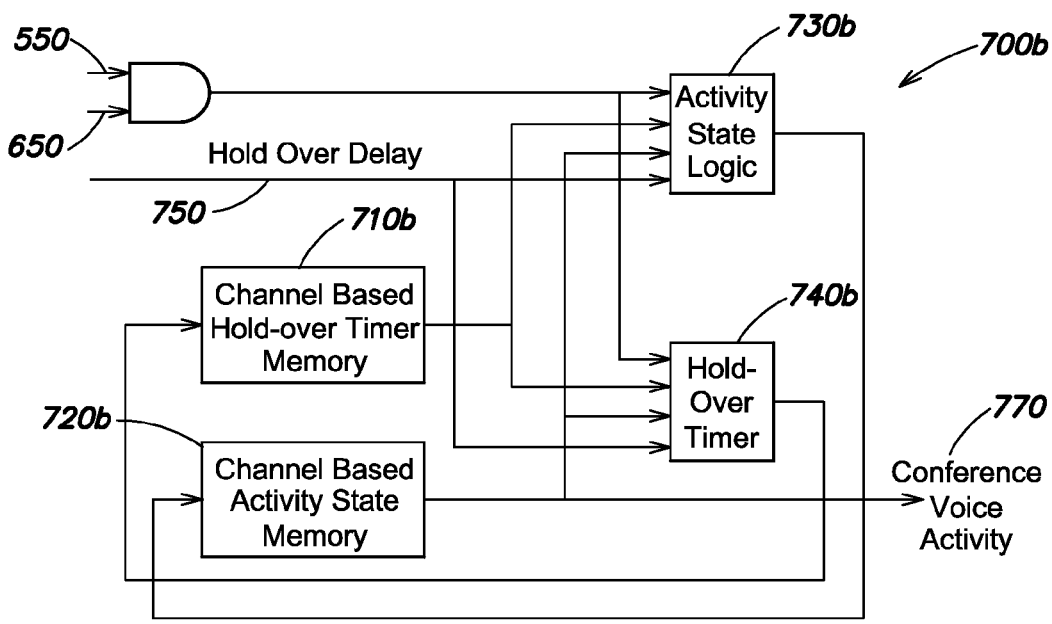
FIG. 7B is a functional block diagram of one example of conference VAD logic/circuitry according to aspects of the present invention.

FIGS. 7A and 7B are functional block diagrams illustrating examples of "monitor" VAD logic (monitor VAD module) and "conference" VAD logic (conference VAD module), according to one embodiment. In the illustrated example, there are two identical monitor and conference VAD logic circuits 700*a*, 700*b*, respectively, driven by different energy thresholds. In particular, referring to FIG. 7A, the inputs to the monitor VAD logic circuit 700*a* are the output (B) from the energy threshold logic (see FIG. 5) and the ZCR voice signal 650. The inputs to the conference VAD logic circuit 700*b* are the ZCR voice signal 650, and the energy over threshold indication signal 550 from the energy threshold logic. Channel based memories 710*a*, 710*b*, 720*a*, and 720*b* allow the logic circuits 700*a* and 700*b* to operate as multiple independent state machines providing activity detection for each channel. As discussed above, a hold-over timer 740*a*, 740*b* may be used to keep the voice determination active through breaks in speech patterns corresponding to audio signal 310. A hold over delay signal 750 defines a time period to maintain voice activity indications filling the gap between spoken words and sentences. In certain examples, it is a threshold value defined for the system.

Figure 8:
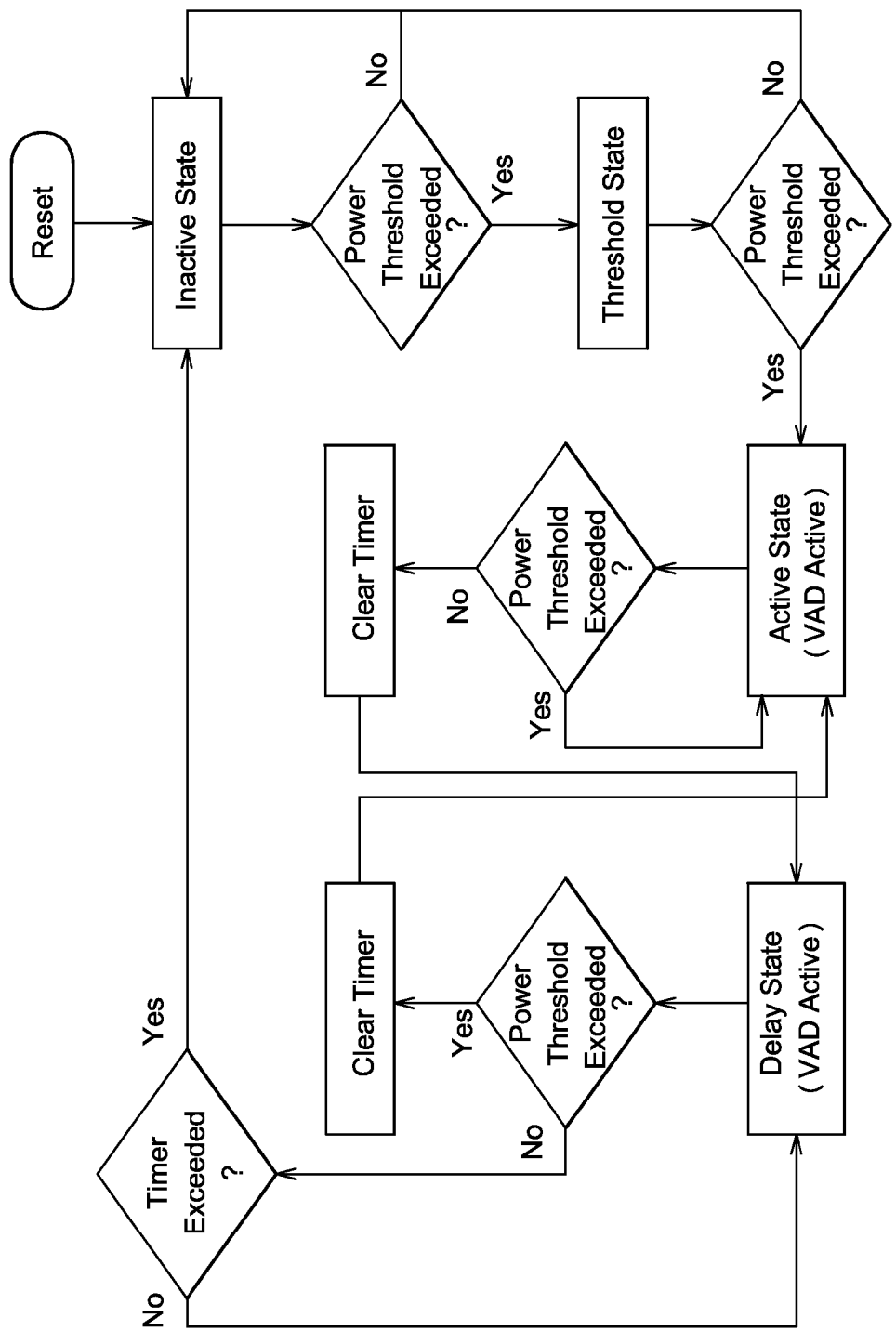
FIG. 8 is a VAD state diagram according to aspects of the present invention.

FIG. 8 illustrates one example of a VAD state machine diagram which may represent either the monitor VAD activity state logic 730*a* or the conference VAD activity state logic 730*b*. In the illustrated example, the state machine requires two consecutive sample periods to exceed the short term energy threshold and be within the ZCR range before the audio in order to flag the audio signal 310 as voice activity. The voice activity flag (760 or 770) may held until the short term energy threshold is not exceeded or the ZCR is not in voice range for a predetermined hold-over time period. In one example, the state machine updates at the programmable sample period; however, the hold-over timer 740*a* or 740*b* may be incremented less frequently, for example, every 64 ms, to conserve memory resources.

The monitor VAD logic circuit 700*a* outputs a monitor voice activity signal 760 responsive to a determination that the audio signal 310 is likely voice. The conference VAD logic circuit 700*b* outputs a conference voice activity signal 770 responsive to a determination that the audio signal 310 is likely voice.

Figure 9:
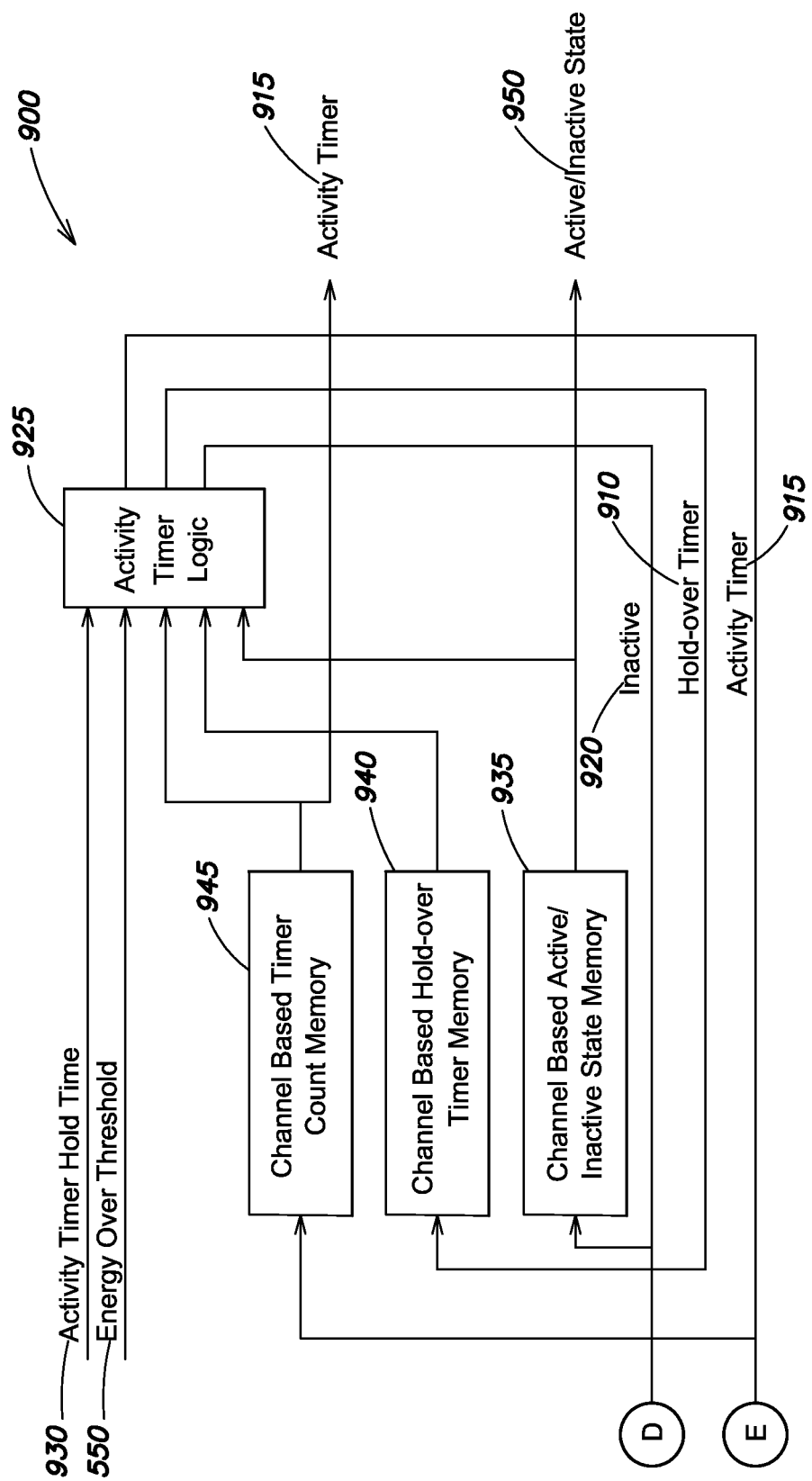
FIG. 9 is a functional block diagram of one example of an activity timer according to aspects of the present invention.

Referring to FIG. 9 there is illustrated a functional block diagram of one example of an activity timer 900 according to certain embodiments. For each channel in the audio conference, the activity timer 900 measures the time that the channel has been either active or inactive. This determination is based on the short term energy threshold, rather than the ZCR range as is the case for the VAD logic. The VAD modules also use a longer hold-over time to keep the channel active through the normal gaps between syllables in speech. According to one embodiment, the activity timer 900 is used to capture the time between these voice gaps as an indicator that the VAD algorithm is being triggered by noise and not voice activity. In certain examples the activity timer does use a short hold-over timer 910 to smooth out sample period energy variation. The activity timer may also be used to measure long periods of inactivity which indicate that the short term energy threshold for a channel has been adjusted too far. In one example the activity timer is implemented with a 512 ms period that can measure up to 32 seconds; however, numerous other time periods may be configured.

According to one embodiment, activity timer logic 925 receives the energy over threshold signal 550, and an activity timer hold time signal 930. The activity timer logic also implements a feedback loop, producing and evaluating (in the feedback loop) an activity timer signal 915, indicating the time period for which the energy over threshold condition (represented by signal 550) has been maintained, and the hold-over timer signal 910 indicating a time period for which the energy over threshold condition (represented by signal 550) has not been met. The inactive signal 920 indicates the activity timer hold time signal 930 has been exceeded. The inactive signal 920, hold-over timer signal 910, and activity timer signal 915 may be stored in channel-based memories 935, 940, and 945, respectively, as shown in FIG. 9. The activity timer 900 may further provide as outputs the activity timer signal 915 and an active/inactive state signal 950.

Figure 10:
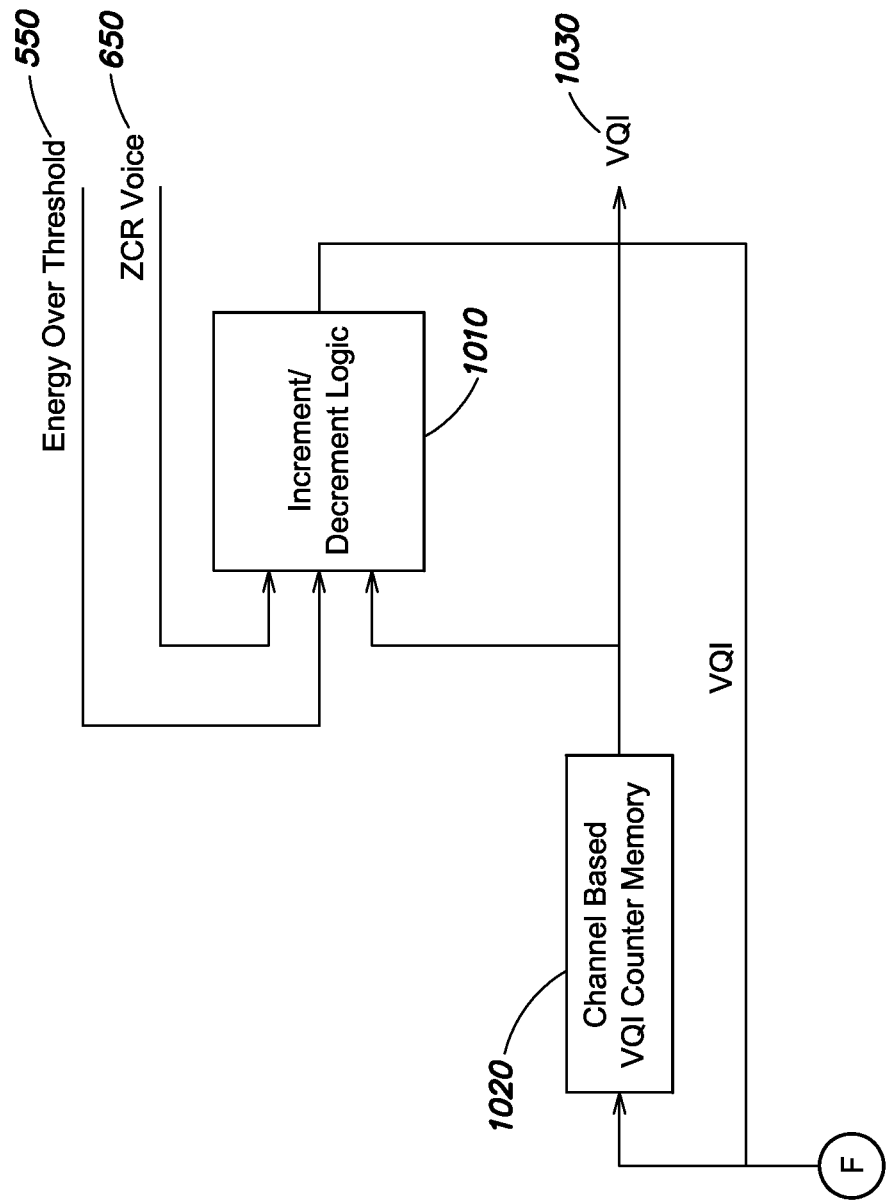
FIG. 10 is a functional block diagram of one example of VQI calculation logic/circuitry according to aspects of the present invention.

An example of VQI calculation logic/circuitry (VQI module) is illustrated in FIG. 10. According to one embodiment, the VQI calculation module uses a simple up/down counter 1010 to keep track of the quality of voice relative to the noise activity on a channel. It uses the ZCR of each sample period (8, 16, or 32 ms) to determine if the audio is most likely noise or voice. In one example, the counter 1010 is initialized to mid range when a channel is connected. The counter 1010 counts up for each sample period that short term energy is above threshold (indicated by input 550) and the ZCR is within the range for voice (indicated by input 650). The counter 1010 counts down for each sample period that short term energy is above threshold and the ZCR is not within the range for voice. In one example, the counter 1010 is implemented as an 8 bit counter, allowing influence of up to 2 to 8 seconds of audio to affect the result. Values of the VQI 1030 below mid range indicate more noise than voice frequency is present in sample periods exceeding the short term energy threshold. Values of the VQI 1030 above mid range indicate more voice than noise frequency is present in sample periods exceeding the short term energy threshold.

As discussed above, the activity timer and the VQI 1030 may be used to make automatic adjustments to the energy threshold 510 to reduce the amount of noise triggering the VAD logic 700*a*, 700*b*. The activity timer indicates how long the audio signal 110 has been either exceeding or not exceeding the energy threshold 510. The VQI 1030 indicates the noise to voice ratio based on a ZCR range for audio with enough energy to exceed the energy threshold 510. The automatic energy threshold adjustment can be either globally enabled for all channels or individually enabled for each channel. The adjustment can also be limited to any value from 0 to 22.5 dB, or another range depending on the application and specific configuration of the system. In one example, the energy threshold 510 may be adjusted up or down in steps of 1.5 dB every 1, 2, 4, or 8 seconds, for example, based on a programmable period. The update rate determines how aggressively the system responds to high noise levels.

Figure 11A:
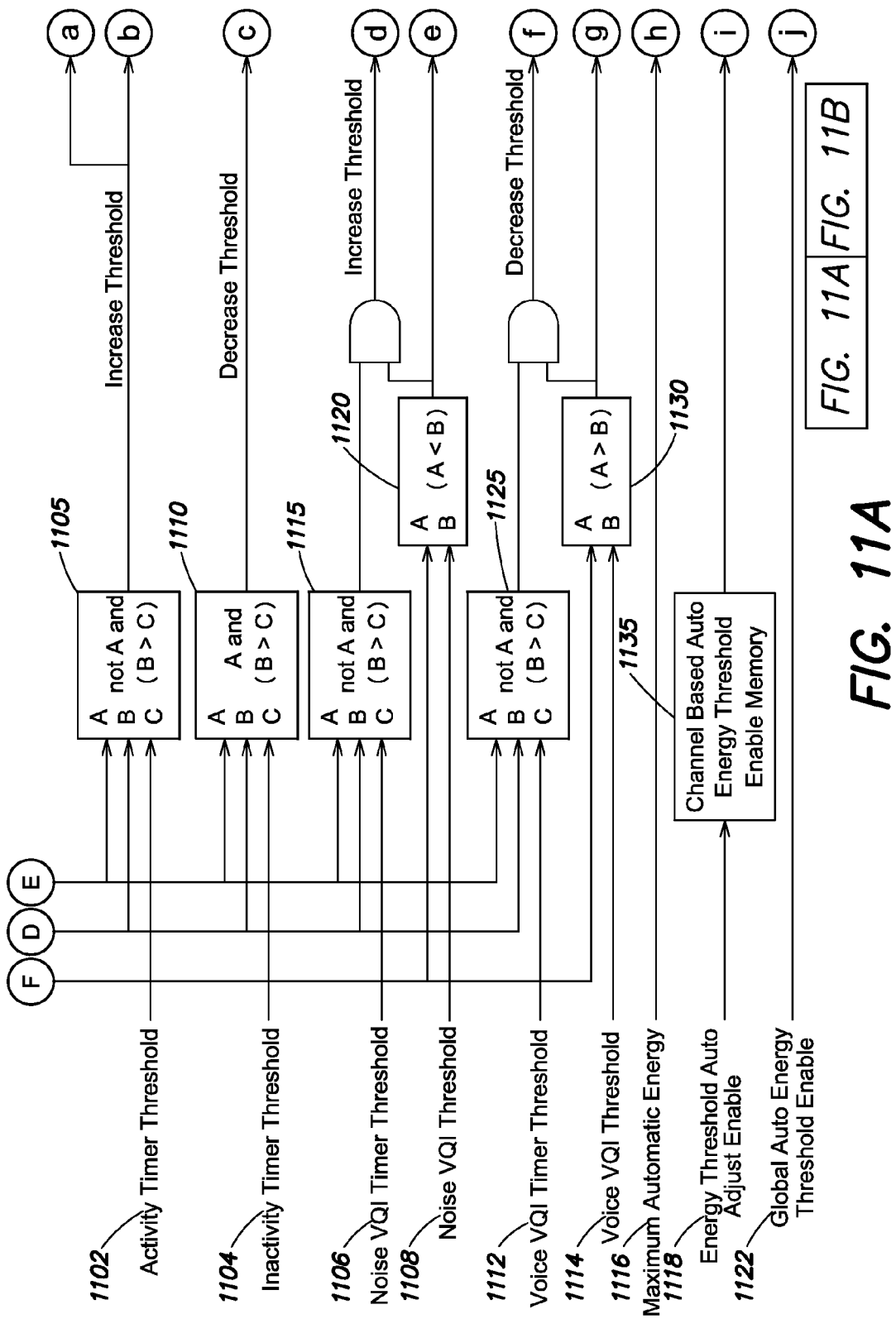
FIGS. 11A and 11B are a functional block diagram of one example of automatic energy threshold adjustment logic/circuitry according to aspects of the present invention.
Figure 11B:
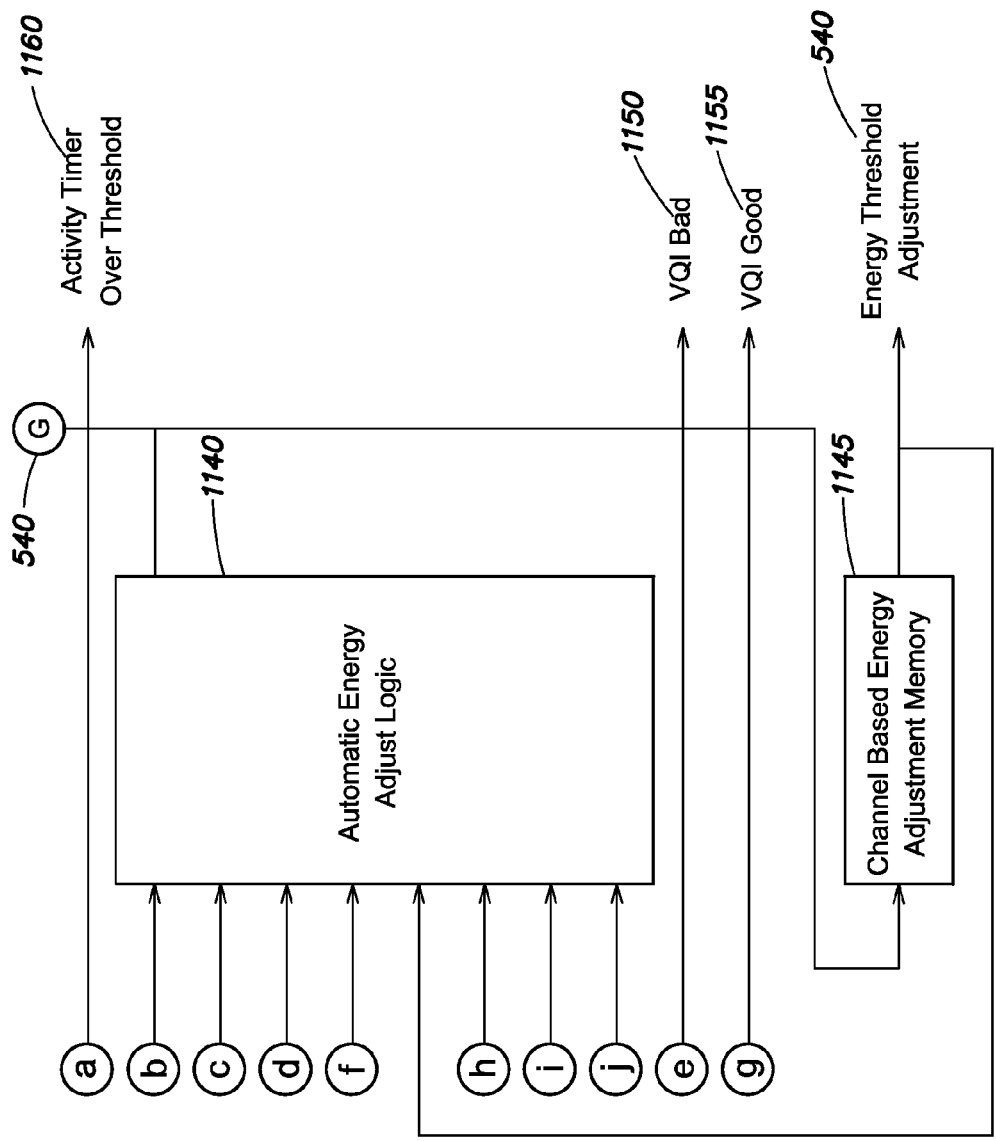

FIG. 11 is a functional block diagram illustrating one example implementation of energy threshold adjustment logic/circuitry (auto-adjustment module) according to certain embodiments. As discussed above with reference to FIG. 2A, one evaluation of the energy threshold may be performed based on the status of the activity timer. For example, a first comparator 1105 may receive and compare an activity timer threshold value 1102, the activity timer signal 915 from the activity timer 900 (E), and the inactive signal 920 from the activity timer 900 (D). If the activity timer signal 915 and inactive signal 920 indicate that the channel has been active for longer than the time set by the activity timer threshold value 1102, the comparator 1105 may produce an "increase energy threshold" input to the automatic energy threshold adjustment logic 1140, and the circuit may output an activity timer over threshold signal 1160. A second comparator 1110 may similarly receive and compare the activity timer signal 915, the inactive signal 920, and an inactivity timer threshold value 1104. If the activity timer signal 915 and inactive signal 920 indicate that the channel has been inactive for longer than the time set by the inactivity timer threshold value 1104, the comparator 1110 may produce a "decrease energy threshold" input to the automatic energy threshold adjustment logic 1140. In certain examples, decreasing the energy threshold may only reverse a prior increased noise energy threshold back towards normal, and not make a clean channel noisy.

As discussed above with reference to FIG. 2B, in certain examples, the activity timer 900 is also used in conjunction with the VQI in automatic adjustment of the energy threshold. In one embodiment, a third comparator 1115 receives and compares the activity timer signal 915, the inactive signal 920, and a noise VQI timer threshold value 1106. A fourth comparator 1120 may receive a noise VQI threshold value 1108 and the VQI signal 1030 (F). If the activity timer has exceeded the noise VQI timer threshold value 1106 and the VQI is below the noise VQI threshold value, an "increase energy threshold" input is provided to the automatic energy threshold adjustment logic 1140. This indicates that the channel is exceeding the energy threshold, but the frequency content of the ZCR shown by the VQI is indicating the audio is probably noise and not voice. In this case, the circuitry may output a "VQI bad" signal 1150. A fifth comparator 1125 may receive and compare the activity timer signal 915, the inactive signal 920, and a voice VQI timer threshold value 1112. A sixth comparator 1130 may receive a voice VQI threshold value 1114 and the VQI signal 1030. If the activity timer has exceeded the voice VQI timer threshold value 1112 and the VQI is above the voice VQI threshold value, a "decrease energy threshold" input is provided to the automatic energy threshold adjustment logic 1140. This indicates the channel is exceeding the energy threshold and the frequency content of the ZCR shown by the VQI is indicating the audio is probably voice and not noise. In the case, the circuitry may output a "VQI good" signal 1155. If the energy threshold logic 1140 is detecting the natural breaks in speech patterns, the energy threshold adjustment will remain unchanged because the activity timer 900 will continue to be reset.

The automatic energy threshold adjustment logic 1140 may further receive a maximum automatic energy adjustment signal 1116, which may set the maximum level to which the energy threshold may be increased. The automatic energy threshold adjustment logic 1140 may also receive channel-based and global (system-wide) enable signals 1118 and 1122, respectively, which activate the automatic energy threshold adjustment logic 1140 for the channel and overall system, respectively. The channel-based automatic energy threshold adjustment enable signal 1118 may be stored in a channel-based memory 1135. The output from the automatic energy threshold adjustment logic 1140 is signal 540 (G), and may also be stored in an associated channel-based memory 1145.

As discussed above, the system may include a variety of registers and memories to store and process data streams produced from sampling the audio signal for each channel. One implementation corresponding to FIGS. 3-11 may include the following.

In one embodiment the system may include a voice quality configuration register, which may be a read/write register that defines system-wide (e.g., for multiple channels) voice quality calculation thresholds. In one example, the voice quality configuration register is a 32-bit read/write register, and may be configured according to Table 1 below.

TABLE 1

| Bits | Description |
| --- | --- |
| 0 to 7 | Noise VQI Threshold: Defines the low threshold for the VQI* (Voice Quality Index) below which the hardware will automatically increase the energy threshold when the energy threshold is broken and the Activity Timer reaches the Noise VQI Timer Limit. This function can be enabled or disabled for each timeslot using the VAD Memory or globally using the Global Auto Energy Threshold Enable. Automatic adjustment to the energy threshold can occur every 1.024 S. Defaults to 0x40. |
| 8 to 15 | Voice VQI Threshold: Defines the high threshold for the VQI* (Voice Quality Index) above which the hardware will automatically decrease the energy threshold when the energy threshold is broken and the Activity Timer reaches the Voice VQI Timer Limit. This function can be enabled or disabled for each timeslot using the VAD Memory or globally using the Global Auto Energy Threshold Enable. Automatic adjustment to the energy threshold can occur every 1.024 S. Defaults to 0xC0. |
| 16 to 19 | Noise VQI Timer Limit: Defines the limit for the Activity Timer* in 512 ms increments when determining if the energy threshold should be adjusted up if the VQI is below the Noise VQI Threshold. Range is 0 to 7.68 S. This function can be enabled or disabled for each timeslot using the VAD Memory. Automatic adjustment to the energy threshold can occur every 1.024 S. Defaults to 0x2 or 1.0 seconds. |
| 20 to 23 | Voice VQI Timer Limit: Defines the limit for the Activity Timer* in 512 ms increments when determining if the energy threshold should be adjusted up if the VQI is above the Voice VQI Threshold. Range is 0 to 7.68 S. This function can be enabled or disabled for each timeslot using the VAD Memory. Automatic adjustment to the energy threshold can occur every 1.024 S. Defaults to 0x2 or 1.0 Seconds. |

TABLE 1-continued

| Bits | Description |
|---|---|
| 24 to 27 | Maximum Auto Energy Threshold: Maximum automatic energy threshold allowed by the hardware in 1.5 dB increments. Range is 0 to 22.5 dB. Default is 0x6 or 9 dB. |
| 28 to 30 | Activity Timer Hold Time: Defines the hold-over time for the Activity Timer* in sample periods that keeps the active state when samples fall below the energy threshold. Default is 4. |
| 31 | Global Auto Energy Threshold Enable: When set to '1' this bit enables automatic energy threshold adjustment for all timeslots independent of the Energy Threshold Auto Adjust Enable bit for each timeslot in the VAD Memory. |

In one example, the system includes a ZCR configuration register that defines system-wide ZCR thresholds and enable flags. These are used to determine if an audio channel has voice activity on it. As discussed above, the ZCR is determined by counting the number of time the polarity of the audio changes in a sample period, and thresholds for minimum and maximum ZCR are used to indicate whether the audio is voice or noise. The ZCR configuration register may also control the period used for voice activity detection processes. In one example, the ZCR configuration register is a 32-bit read/write register, and may be configured according to Table 2 below.

TABLE 2

| Bits | Description |
|---|---|
| 0 to 7 | Low ZCR Threshold: Defines the low threshold 645 for the ZCR. If the ZCR is below this for a sample period the audio signal 310 will not be considered voice. A value of 0x80 represents a 2 KHz frequency. Default to 0x00 disabling the function. The voice determination for each timeslot can be read from the VAD Memory. |
| 8 to 15 | High ZCR Threshold: Defines the high threshold 640 for the ZCR. If the ZCR is above this for a sample period the audio signal 310 will not be considered voice. A value of 0x80 represents a 2 KHz frequency. Default to 0xFF disabling the function. The voice determination for each timeslot can be read from the VAD Memory. |
| 16 to 21 | Inactivity Timer Limit: Defines the limit for the activity timer in 512 ms increments when determining if the energy threshold should be adjusted down. Range is 0 to 32.256 s. This function can be enabled or disabled for each timeslot using the VAD Memory. Automatic adjustment to the energy threshold can occur every 1.024 S. Defaults to 0x16 or 8.0 seconds. |
| 22 to 27 | Activity Timer Limit. Defines the limit for the activity timer in 512 ms increments when determining if the energy threshold should be adjusted up due to noise. Range is 0 to 32.256 s. This function can be enabled or disabled for each timeslot using the VAD Memory. Automatic adjustment to the energy threshold can occur every 1.024 S. Defaults to 0x16 or 8.0 Seconds. |
| 28 to 29 | Sample Period: Defines the timing period used for voice activity detection. The voice activity determination for each timeslot can be read from the VAD Memory.<br>0: 1 ms (8 samples) - Used for testing<br>1: 8 ms (64 samples) - Default<br>2: 16 ms (128 samples)<br>3: 32 ms (256 samples) |

TABLE 2-continued

| Bits | Description |
|---|---|
| 30 to 31 | Energy Adjustment Period: Defines the timing period used for automatic energy adjustments.<br>0: 1 Seconds<br>1: 2 Seconds<br>2: 4 Seconds<br>3: 8 Seconds |

The system may further include an activity threshold and delay register. In one example, this is a 9-bit register that defines the system wide input threshold and delay values. These are used to determine whether or not an audio channel has voice activity on it. In one example, the activity threshold and delay register may be configured according to Table 3 below.

TABLE 3

| 31-9 | 8 | 7 | 6 | 5 | 4 | 3 | 2 | 1 | 0 |
|---|---|---|---|---|---|---|---|---|---|
|  |  | Delay |  |  |  |  | Threshold |  |  |
|  | 4 | 3 | 2 | 1 | 0 | 3 | 2 | 1 | 0 |

According to one embodiment, in Table 3, "Delay" defines the delay time that the activity status is held active when the audio is not exceeding the threshold. In one example, Delay equals 1.024 seconds for binary 00000, and 0.032 seconds for binary 11111, in 32 millisecond steps. One example of Delay interval programming for the delay bits of the activity threshold and delay register is shown below in Table 4.

TABLE 4

| Value | Delay |
|---|---|
| 0x00 | 1024 ms |
| 0x01 | 992 ms |
| 0x02 | 960 ms |
| 0x03 | 928 ms |
| 0x04 | 896 ms |
| 0x05 | 864 ms |
| 0x06 | 832 ms |
| 0x07 | 800 ms |
| 0x08 | 768 ms |
| 0x09 | 736 ms |
| 0x0A | 704 ms |
| 0x0B | 672 ms |
| 0x0C | 640 ms |
| 0x0D | 608 ms |
| 0x0E | 576 ms |
| 0x0F | 544 ms |
| 0x10 | 512 ms |
| 0x11 | 480 ms |
| 0x12 | 448 ms |
| 0x13 | 416 ms |
| 0x14 | 384 ms |
| 0x15 | 352 ms |
| 0x16 | 320 ms |
| 0x17 | 288 ms |
| 0x18 | 256 ms |
| 0x19 | 224 ms |
| 0x1A | 192 ms |
| 0x1B | 160 ms |
| 0x1C | 128 ms |
| 0x1D | 96 ms |
| 0x1E | 64 ms |
| 0x1F | 32 ms |

According to one embodiment, in Table 3, "Threshold" defines the threshold value for determining activity on a receive channel. The threshold value may be defined with the short term energy of the audio in 3 dB steps. Individual timeslots may over-ride this value using the VAD memory discussed below. One example of Threshold interval programming for the threshold bits of the activity threshold and delay register is shown below in Table 5.

TABLE 5

| Value | Threshold |
|---|---|
| 0xF | 0.1 mW |
| 0xE | 0.2 mW |
| 0xD | 0.4 mW |
| 0xC | 0.8 mW |
| 0xB | 1.7 mW |
| 0xA | 3.4 mW |
| 0x9 | 6.8 mW |
| 0x8 | 13.6 mW |
| 0x7 | 27.1 mW |
| 0x6 | 54.3 mW |
| 0x5 | 109 mW |
| 0x4 | 217 mW |
| 0x3 | 434 mW |
| 0x2 | 868 mW |
| 0x1 | 1737 mW |
| 0x0 | 3474 mW |

As discussed above, the system may include a VAD memory that reports the status of and controls the VAD logic. In one example, the VAD memory is a 4K×32-bit read-only memory. In one example, the VAD memory may be configured according to Table 6 below.

TABLE 6

| Bits | Definition |
|---|---|
| 0 | Energy Over Threshold (Read Only) - This bit is set to '1' when the power exceeds the conference energy threshold for the last sample window. |
| 1 to 7 | Audio Power (Read Only) - Power measurement for the last sample window (8mS default controlled by the ZCR configuration register) in 3/8 decibel increments |
| 8 | VAD (Read Only) - Voice Activity Detected based on energy and ZCR thresholds. This detection includes the hold-over delay time from the Threshold/Delay Register and is used for Conference Processing. Note that the ZCR thresholds default to disable this from affecting VAD leaving only the energy threshold. The thresholds for ZCR are set in the ZCR configuration register discussed above. |
| 9 | Monitor VAD (Read Only) - Voice Activity Detected based on energy and ZCR thresholds. Unlike the VAD bit, this voice activity is only used for monitoring purposes and has a different programmable energy threshold. This detection includes the hold-over delay time from the Threshold/Delay Register. Note that the ZCR thresholds default to disable this from affecting VAD leaving only the energy threshold. The thresholds for ZCR are set in the ZCR configuration register discussed above. |
| 10 to 11 | Reserved |
| 12 to 15 | Energy Threshold Adjustment (Read Only) - Shows the number of 1.5 dB steps the energy threshold is be raised by the hardware to reduce noisy audio. Note that this hardware function defaults to disabled and must be enabled and the thresholds set in the Voice Quality Configuration Register. |
| 16 | Zero Crossing Rate Voice Detect (Read Only) - Determination that audio is voice based on the ZCR (Zero Crossing Rate). ZCR is higher for noise than it is for voice and is an indicator of the frequency at which the energy is concentrated. The high and low thresholds for ZCR are set in the ZCR configuration register to determine voice activity. |

TABLE 6-continued

| Bits | Definition |
|---|---|
| 17 | Voice Quality Index Bad (Read Only) - Set to '1' if the VQI is below the low threshold in the voice quality configuration register. The VQI indicates if the ZCR indicates voice or noise for periods that are over the energy threshold. The actual VQI can be read from the VQI Memory. |
| 18 | Voice Quality Index Good (Read Only) - Set to '1' if the VQI is above the high threshold in the voice quality configuration register. The VQI indicates if the ZCR indicates voice or noise for periods that are over the energy threshold. The actual VQI can be read from the VQI Memory. |
| 19 | Activity Timer Over Limit (Read Only) - Set to '1' if the activity timer is at or above the Activity Timer Limit set in the ZCR configuration register. The Activity Timer indicates how long the channel has exceeded the energy threshold or how long it has not. Long active time values indicate that the natural breaks in speech are not being detected. The actual Activity Timer value can be read from the VQI Memory. |
| 20 | Inactivity Timer Over Limit (Read Only) - Set to '1' if the Activity Timer is at or above the Inactivity Timer Limit set in the ZCR configuration register. The Activity Timer indicates how long the channel has exceeded the energy threshold or how long it has not. Long inactive time values indicate that any energy threshold adjustments may need to be removed. The actual Activity Timer value can be read from the VQI Memory. |
| 21 to 22 | Reserved |
| 23 | Energy Threshold Auto Adjust Enable (Read/Write) - Enables adjustment of the conference energy threshold based on the VQI and the Activity Timer. The energy threshold adjustment will be adjusted each second based on VQI and Activity Timer thresholds found in the Voice Quality Configuration Register/ZCR configuration register. This bit is not used if the Global Auto Energy Threshold Enable in that register is set. Defaults to disabled ('0'). |
| 24 to 27 | Conference Energy Threshold Delta (Read/Write) - Conference energy threshold delta value increasing the global conference energy threshold in 1.5 dB steps. This threshold affects conference processing. The global threshold is controlled by the Threshold/Delay Register. |
| 28 to 31 | Monitor Energy Threshold Delta (Read/Write) - Monitor energy threshold delta value increasing the global conference energy threshold in 1.5 dB steps. This threshold affects the Monitor VAD bit in this memory. The global threshold is controlled by the Threshold/Delay Register. |

The system may further include a voice quality memory that reports the status of the voice quality logic and may provide supplementary data to fine tune the VAD logic discussed above. In one example, the voice quality memory is a 4K×32-bit read-only memory. In one example, the voice quality memory may be configured according to Table 7 below.

TABLE 7

| Bits | Definition |
|---|---|
| 0 to 7 | Voice Quality Index (Read Only) - Values above 0x80 indicate detection of voice. Values below 0x80 indicate the detection of noise. Value is reset to 0x80 when no connection is made and increments or decrements for each sample period that the power level of audio is above threshold based on the ZCR. |

TABLE 7-continued

| Bits | Definition |
| --- | --- |
| 8 to 13 | Activity Timer (Read Only) - Timer in 512 ms increments showing how long the energy threshold has remained broken or not broken. See the Active Timer State bit to determine if the channel is active or inactive. The active state has a hold-over delay defined by Activity Timer Hold Time in the ZCR configuration register. Range is 0 to 32.256 seconds. |
| 14 to 15 | Reserved |
| 16 | Active Timer State (Read Only) - This bit shows if the Activity Timer is measuring activity or inactivity. The bit is '0' when the timer is measuring activity and '1 'when it is measuring inactivity. |
| 13 to 31 | Reserved |

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of reducing noise in a multi-channel audio conference, the method comprising for each channel in the multi-channel audio conference:
receiving an audio signal;
analyzing the audio signal using a voice activity detection process to determine whether the audio signal corresponds to voice or noise, the analyzing including calculating an energy of a packet of the audio signal, calculating a zero crossing rate (ZCR) of the packet, and comparing the energy of the packet against an energy threshold;
determining that the audio signal is in an active state responsive to the energy of the packet exceeding the energy threshold, or that the audio signal is in an inactive state responsive to the energy of the packet not exceeding the energy threshold;
recording an activity timer value equal to an amount of time elapsed until a change between the active state and the inactive state of the audio signal;
calculating a voice quality index (VQI); and
producing an indication that the audio signal contains voice based on a combination of the voice activity detection process, the activity timer value, and the VQI.

2. The method of claim 1 wherein calculating the ZCR of the packet includes counting a number of times a polarity of the audio signal changes in the packet.

3. The method of claim 1 further comprising:
comparing the ZCR of the packet to a first threshold value defining an upper limit for a voice range of the ZCR;
comparing the ZCR of the packet to a second threshold value defining a lower limit for the voice range; and
producing a ZCR voice signal responsive to the ZCR of the packet being with the voice range.

4. The method of claim 3 wherein calculating the VQI includes:
initializing a VQI counter;
incrementing the VQI counter responsive to the energy of the packet exceeding the energy threshold and the ZCR of the packet being outside the voice range;
decrementing the VQI counter responsive to the energy of the packet exceeding the energy threshold and the ZCR of the packet being within the voice range; and
reading out the VQI counter to provide the VQI.

5. The method of claim 4 wherein analyzing the audio signal using the voice activity detection process includes determining that the audio signal corresponds to voice based on a combination of the ZCR voice signal and the energy of the packet exceeding the energy threshold.

6. The method of claim 5 further comprising automatically adjusting the energy threshold based on the activity timer value.

7. The method of claim 5 further comprising automatically adjusting the energy threshold based on a combination of the activity timer and the VQI.

8. The method of claim 7 wherein automatically adjusting the energy threshold includes increasing the energy threshold responsive to the audio signal being in the active state, the activity timer value exceeding a first time limit, and the VQI being below a VQI noise threshold value.

9. The method of claim 8 wherein automatically adjusting the energy threshold further includes decreasing the energy threshold responsive to the audio signal being in the active state, the activity timer value exceeding a second time limit, and the VQI being above a VQI voice threshold value.

10. A field-programmable gate array (FPGA) implemented audio conference noise control circuit comprising:
a zero crossing rate (ZCR) module configured to receive an audio signal and to determine a ZCR of a packet of the audio signal;
an energy calculation module configured to receive the audio signal and to determine an energy of the packet of the audio signal and output an encoded power value signal representative of the energy of the packet of the audio signal;
an energy threshold module configured to compare the encoded power value signal to an energy threshold value and to output an energy-over-threshold signal responsive to the encoded power value signal exceeding the energy threshold value;
an activity timer configured to receive the energy-over-threshold signal from the energy threshold module and to output an activity timer signal representing an amount of time for which the energy-over-threshold signal has been maintained; and
a voice quality index (VQI) module configured to output a VQI of the audio signal, the VQI module including a counter configured to increment responsive to the energy of the packet of the audio signal exceeding the energy threshold value and the ZCR being outside of a range of ZCR values for voice, and to decrement responsive to the energy of the packet of the audio signal exceeding the energy threshold value and the ZCR being within the range of ZCR values for voice, the VQI corresponding to an output value of the counter.

11. The FPGA implemented audio conference noise control circuit of claim 10 wherein the ZCR module is further configured to compare the ZCR to a first threshold value and a second threshold value higher than the first threshold value, ZCR values between the first threshold value and the second threshold value corresponding to the range of ZCR values for voice.

12. The FPGA implemented audio conference noise control circuit of claim 10 wherein the ZCR module is configured to determine the ZCR by counting a number of times a polarity of the audio signal changes in the packet.

13. The FPGA implemented audio conference noise control circuit of claim 10 further comprising an automatic energy threshold adjustment module configured to automatically adjust the energy threshold value based on the activity timer signal.

14. The FPGA implemented audio conference noise control circuit of claim 13 wherein the automatic energy threshold adjustment module is configured to increase the energy threshold value responsive to the time for which the energy-over-threshold signal has been maintained exceeding an activity timer threshold value.

15. The FPGA implemented audio conference noise control circuit of claim 14 wherein the automatic energy threshold adjustment module is further configured to automatically adjust the energy threshold value based on a combination of the activity timer signal and the VQI.

\* \* \* \* \*